United States Patent [19]
Shou et al.

[11] Patent Number: 5,579,411
[45] Date of Patent: Nov. 26, 1996

[54] HIGH-SPEED CIRCUIT FOR PERFORMING PATTERN MATCHING OF IMAGE DATA AND THE LIKE SUITABLE FOR LARGE SCALE INTEGRATION IMPLEMENTATION

[75] Inventors: Guoliang Shou; Sunao Takatori; Makoto Yamamoto, all of Tokyo, Japan

[73] Assignees: Yozan Inc., Tokyo; Sharp Corporation, Osaka, both of Japan

[21] Appl. No.: 426,587

[22] Filed: Apr. 21, 1995

Related U.S. Application Data

[63] Continuation of Ser. No. 108,423, Aug. 19, 1993, abandoned.

[30] Foreign Application Priority Data

Aug. 21, 1992 [JP] Japan ................................. 4-245657

[51] Int. Cl.⁶ ............................................. G06K 9/62
[52] U.S. Cl. .................................................. 382/217
[58] Field of Search .......................... 364/604, 728.03; 382/209, 217, 218, 278, 304

[56] References Cited

U.S. PATENT DOCUMENTS 4,040,010 8/1977 Crane et al. ........................ 382/13
5,014,330 5/1991 Kobayashi et al. ................ 382/30
5,022,086 6/1991 Crane et al. ........................ 382/2

OTHER PUBLICATIONS

Iijima, Taizo, "Theory of Pattern Recognition", Morikita Shuppan Kabushiki Kaisha, 1989, pp. 111–130.

Primary Examiner—Andrew W. Johns
Attorney, Agent, or Firm—Cushman, Darby & Cushman

[57] ABSTRACT

A pattern matching system includes a circuit that matches an input image with a template based on a correlation function. The circuit has a structure which makes it particularly suitable for implementation in Large Scale Integration (LSI) technologies. A pattern matching circuit according to this invention sets up a threshold value of a correlation coefficient and evaluates the following formula, $$E=N^2\{\Sigma(f_i-f_m)(g_i-g_m)\}^2 - p_{th}^2 N^2 \sigma_f^2 \sigma_g^2$$

where N is a number of input data points. $f_i$ is an input data point. $f_m$ is a mean value of input data points. $g_i$ is a template data point. $g_m$ is a mean value of template data points. $\sigma_f$ is a standard deviation of input data points and $\sigma_g$ is a standard deviation of template data points in a range over a threshold value.

13 Claims, 1 Drawing Sheet

HIGH-SPEED CIRCUIT FOR PERFORMING PATTERN MATCHING OF IMAGE DATA AND THE LIKE SUITABLE FOR LARGE SCALE INTEGRATION IMPLEMENTATION

This is a continuation of application Ser. No. 08/108,423, filed on Aug. 19, 1993, which was abandoned.

FIELD OF THE INVENTION

The present invention relates to a pattern matching circuit performing pattern matching based on a regular correlation function.

BACKGROUND OF THE INVENTION

Pattern matching based on a normalized correlation coefficient is very important processing for checking image quality, and high-speed processing is also needed in such procedures. On the other hand, the normalized correlation coefficient technique needs complicated calculations such as an integration of an input data and a template data and a division of the integrated result divided by a standard deviation. As a result, the necessity of using Large Scale Integration (LSI) fabrication for the normalized correlation coefficient is high.

SUMMARY OF THE INVENTION

The present invention is invented so as to solve the above-referenced conventional problems and has a purpose to provide a pattern matching circuit easily realized on an LSI chip of a normalized correlation function.

A pattern matching circuit according to this invention sets up a threshold value $p_{th}$ of a correlation coefficient and evaluates Formula 1.

$$E = N^2 \{\Sigma(f_i - f_m)(g_i - g_m)\}^2 - p_{th}^2 N^2 \sigma_f^2 \sigma_g^2 \quad (1)$$

where N is a number of input data points. $f_i$ is an input data point. $f_m$ is a mean value of input data points. $g_i$ is a template data point. $g_m$ is a mean value of template data points. $\sigma_f$ is a standard deviation of input data points and $\sigma_g$ is a standard deviation of template data points in a range over a threshold value.

PREFERRED EMBODIMENT OF THE PRESENT INVENTION

Hereinafter, an embodiment of a pattern matching circuit according to this invention is described, citing an example of a pattern matching of an image.

Figure 1:
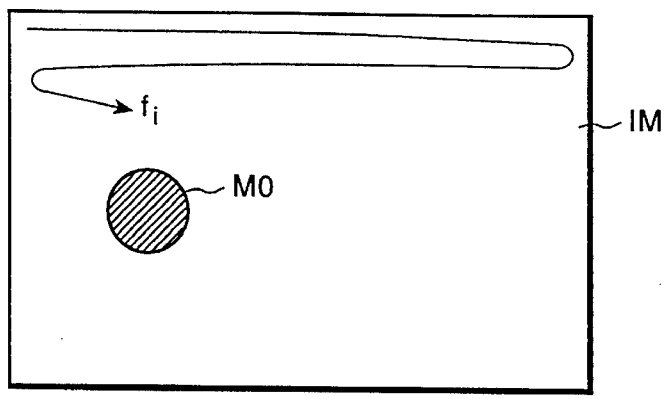
FIG. 1 is an input image.
Figure 2:
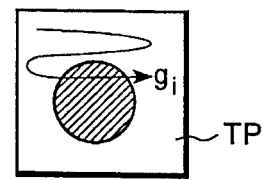
FIG. 2 is a template image.

FIG. 1 shows an input image IM including a matching object MO, and FIG. 2 shows a template TP for detecting the matching object MO.

In the input image IM, each pixel $f_i$ is inputted to a pattern matching circuit in the order of scanlines, and a pixel $g_i$ of the template TM is inputted to the pattern matching circuit.

Figure 3:
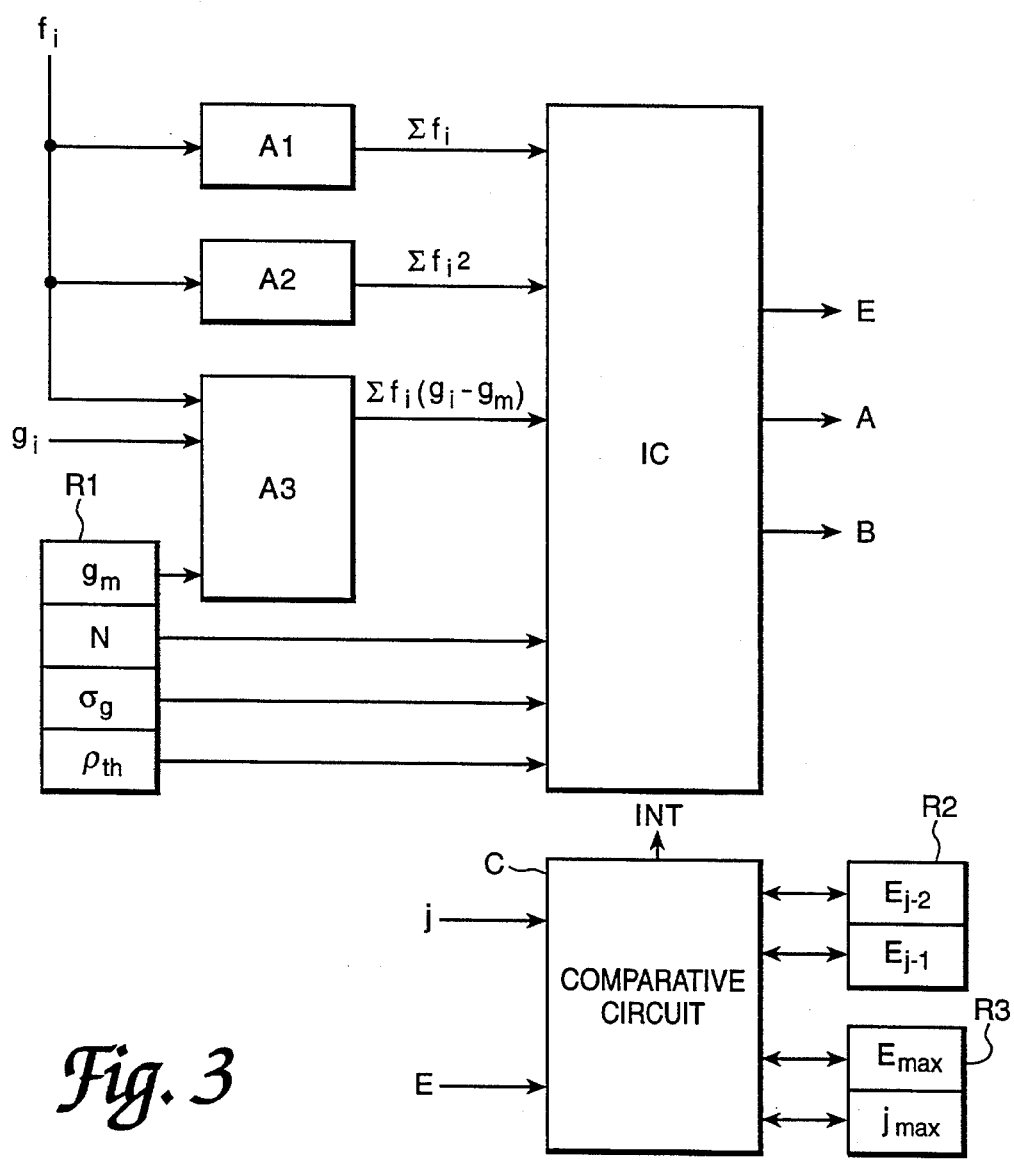
FIG. 3 is a block diagram of an embodiment of a pattern matching circuit according to the present invention.

The pattern matching circuit is constructed as shown in FIG. 3, and has the first arithmetic circuit ("first integrating means") A1, the second arithmetic circuit ("second integrating means") A2 and the third arithmetic circuit ("third integrating means") A3, where pixel data of an input image $f_i$ is inputted to each means.

The first integrating means A1 calculates the integrating value '$\Sigma f_i$' of the pixel data $f_i$. Here, in order to process the whole image data once, a large amount of high speed memories are needed, and generally only a part of the image data is processed, for example, taking 16 pixels step by step. In this case, the first integrating means A1 performs this integration of 16 pixels, as shown in Formula 2.

$$\sum_{i=1}^{16} f_i \quad (2)$$

For example, when the size of a template TM is m×n=N, the integration of Formula 3 is necessary.

$$\sum_{i=1}^{N} f_i \quad (3)$$

The integrating result of applying Formula 2 is preserved and finally provides a result of Formula 3 after integrating the same integrating result in the following processings.

The second integrating means A2 calculates the integrating value '$\Sigma f_i^2$' of squared pixel data $f_i$. Similar to Formula 2, a part of the image data, such as sixteen successive pixels, are inputted to be processed. The second integrating means A2 integrates 16 pixels, as shown in Formula 4.

$$\sum_{i=1}^{16} f_i^2 \quad (4)$$

For the template size m×n=N pixels, the integrating result of Formula 4 is preserved and provides the result of Formula 5 finally after integrating the similar integration results; in executing Formula 5.

$$\sum_{i=1}^{N} f_i^2 \quad (5)$$

The third integrating means A3 calculates an integration value $\Sigma f_i(g_i - g_m)$ of an image data $f_i$ and a deviation of template data $(g_i - g_m)$. Similarly to Formula 2, 16 pixels are successively taken and a part of the image data is taken and processed.

The third integrating means A3 calculates an integration of these sixteen pixels as shown in Formula 6.

$$\sum_{i=1}^{16} f_i(g_i - g_m) \quad (6)$$

For a template size m×n=N pixels, for performing integration of Formula 7, $$\sum_{i=1}^{N} f_i(g_i - g_m) \quad (7)$$

the integrating result of Formula 6 is preserved and a result of Formula 7 is finally obtained after integrating the similar integration results.

Here, when Formula 8 and Formula 9 are provided, $$A = \sum_{i=1}^{N} f_i(g_i - g_m) \quad (8)$$

$$B = N \sum_{i=1}^{N} f_i^2 - \left\{ \sum_{i=1}^{N} f_i \right\}^2 \quad (9)$$

a correlation coefficient $\sigma$ is calculated as shown in Formula 10.

$$\rho = N A / (\sigma_g a \sqrt{B}) \tag{10}$$

where $\sigma_g$ is a deviation value of a template image.

It is necessary to perform division to calculate a correlation coefficient, but it is generally impossible for hardware to perform division at a high speed. Then Formula 10 is rewritten as shown in Formula 11.

$$E = N^2 A^2 - k B \tag{11}$$

$$k = \rho_{th}^2 \sigma_g^2$$

where $\rho_{th}$ is a threshold value of a correlation coefficient.

An allowable minimum value of the correlation coefficient $\sigma$ is set up, and the denominator and numerator are compared based on the value. Here, $(N^2 A^2)$ is a squared numerator and kB is a squared denominator multiplied by $(\rho_{th}^2)$.

Outputs from the first integrating means to the third one are inputted into the fourth arithmetic circuit ("total operating means") IC, and E of Formula 11 is calculated there. The total operating means IC is connected to $g_m$, N, and $\sigma_g$ which can be calculated beforehand and for using a register R1 for registering $\rho_{th}$ which is set up previously and E is calculated with reference to these data.

An output E of the total operating means IC and the number j showing the number of times of pattern matching (a position of search areas) are inputted to a comparative circuit C, and the comparative circuit C compares a value of E in three successive search areas (here they are described as $E_{j-2}$, $E_{j-1}$ and $E_j$). When $E_{j-2} \leq E_{j-1}$ and $E_j \geq E_{j-2}$, then $E_{j-1}$ is deemed as the maximum value. When a few areas should be abstracted, the operation is stopped once because of the possibility of omitting the following operations by performing an evaluation at each maximum value (precise pattern matching by the $\rho$ calculation, etc.) For performing this processing, register R2 is set up to preserve $E_{j-2}$ and $E_{j-1}$. When this operation is stopped, the comparative circuit C outputs a stop signal INT to each computational module.

Calculating the maximum value of E in search areas of a predetermined number. Register 3 is provided for preserving the maximum value and a position of the maximum value in the case of evaluating the maximum value.

If $\rho_{th}$ is suitable, the maximum value of E is generated close to the maximum value of a correlation coefficient and a part of the input image is extracted substantially coincident with the template image. Only from this rough matching can final judgment be performed; that is, a judgment is performed if a part exists coincident to the template or not and where the coincidence occurs. In order to perform more detailed pattern matching, searching neighboring areas of the maximum value of E. $\rho$ is calculated by the Formula 10, and the maximum value of $\rho$ and its value are calculated. For calculating Formula 10, the outputs from pattern matching circuits A and B are inputted to an LSI, with a divisional function, such as a CPU.

The detailed correlation coefficient of the formula (10) is calculated only for areas where the simplified correlation coefficient of the formula (1) without division has a local maximum value. The calculation of formula (1) can be performed by other circuits or devices than the circuit in FIG. 3. Therefore, the circuit can be made simple and small.

As mentioned above, a pattern matching circuit according to this invention has a threshold value of a correlation coefficient and evaluates Formula 2 (N is a number of input data, $f_i$ is an input data, $f_m$ is a mean value of input data, $g_i$ is a template data, $g_m$ is a mean value of template data, $\rho_{th}$ is a threshold value of a correlation function. $\sigma_f$ is a standard deviation of input data. $\sigma_g$ is a standard deviation of template data) in a range over the threshold value.

What is claimed is:

1. A digital electronic image processing circuit for detecting a pattern in an image, said circuit comprising:

an input signal line receiving a series of digital image pixel values, each pixel value representing a measurement of lightness of a region of an image;

first, second and third arithmetic circuits having first, second and third outputs respectively, said first, second and third arithmetic circuits receiving a common input on said input signal line, said first, second and third outputs connected in parallel to a fourth circuit;

a gamma register storing a series of template pixel values and communicating the template pixel values to said third arithmetic circuit, the template pixel values representing the pattern;

wherein said first arithmetic circuit generates an output signal characterized as a sum of image pixel values;

wherein said second arithmetic circuit generates an output signal characterized as a sum of squares of image pixel values;

wherein said third arithmetic circuit generates an output signal characterized as:

$$\Sigma fi(gi - gm)$$

where fi represent the image pixel values, and
   where gi represent the template pixel values; and wherein the fourth circuit generates an output signal representing a measure of similarity between said template pixel values and said input pixel values, thereby detecting the pattern in the image.

2. The circuit of claim 1 further comprising a sigma register storing a digital signal representing a standard deviation of lightness of the template pixel values.

3. The circuit of claim 2 wherein the fourth arithmetic circuit generates a series of correlation measures, and wherein the digital electronic image processing circuit further comprises a comparator circuit generating a signal halting the operation of the fourth arithmetic circuit.

4. The circuit of claim 3 further comprising a first E register storing a first one of the series of correlation measures.

5. The circuit of claim 4 further comprising a second E register storing a second one of the series of correlation measures.

6. The circuit of claim 3 further comprising a max-E register storing a maximum one of the series of correlation measures.

7. The circuit of claim 3 further comprising a j register storing a count of a number of correlation measures in the series of correlation measures.

8. The circuit of claim 3 further comprising:

a first E register storing a first one of the series of correlation measures;

a second E register storing a second one of the series of correlation measures;

a max-E register storing a maximum one of the series of correlation measures;

wherein the comparator circuit compares successive ones of the series of correlation measures; and wherein a maximum one of the compared measures is stored in the max-E register.

9. The circuit of claim 1 further comprising a rho register storing a threshold value for a correlation.

10. The circuit of claim 1 wherein the fourth circuit generates a measure of correlation E characterized as:

$$E = N^2 A^2 - \kappa B$$

where A is characterized as:

$$A = \sum_{i=1}^{N} f_i (g_i - g_m)$$

where B is characterized as:

$$B = N \sum_{i=1}^{N} f_i^2 - \left\{ \sum_{i=1}^{N} f_i \right\}^2 \quad (9)$$

where $\kappa$ is characterized as:

$$k = \rho_{th}^2 \sigma_g^2$$

where N is a number of input pixel values; and
where $\sigma_g$ is characterized as a standard deviation of the template pixel values.

11. A digital electronic image processing circuit for recognizing a pattern in an image, the circuit comprising:

an input signal line receiving a series of input digital signals;

a first circuit generating a first digital output signal in response to said series of input digital signals received from said input signal line;

a second circuit generating a second digital output in response to said series of input digital signals received from said input signal line;

a third circuit generating a third digital output signal in response to said series of input digital signals received from said input signal line;

a storage register storing a series of template digital signals, an output of said storage register connected to an input of said third circuit, the template of digital signals representing the pattern; and a fourth circuit receiving said first, second and third outputs in parallel and generating a fourth output representing a measure of similarity between said template digital signals and said input digital signals, thereby detecting the pattern in the image.

12. The circuit of claim 11 wherein the first series of digital electronic signals comprises a series of image pixel values, each pixel being a digital measurement of lightness of a region of an image.

13. The circuit of claim 12 wherein the first circuit is an adder, and the output of the first circuit is a sum of input digital signals.

* * * * *